(12) United States Patent
Zhao et al.

(10) Patent No.: US 11,824,618 B2
(45) Date of Patent: Nov. 21, 2023

(54) BEAM FAILURE RECOVERY METHOD AND DEVICE, AND TERMINAL DEVICE

(71) Applicant: DATANG MOBILE COMMUNICATIONS EQUIPMENT CO., LTD., Beijing (CN)

(72) Inventors: Yali Zhao, Beijing (CN); Pierre Bertrand, Beijing (CN); Li Chen, Beijing (CN); Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 292 days.

(21) Appl. No.: 17/285,823

(22) PCT Filed: Nov. 11, 2019

(86) PCT No.: PCT/CN2019/117055
§ 371 (c)(1),
(2) Date: Apr. 15, 2021

(87) PCT Pub. No.: WO2020/098591
PCT Pub. Date: May 22, 2020

(65) Prior Publication Data
US 2021/0384960 A1    Dec. 9, 2021

(30) Foreign Application Priority Data
Nov. 16, 2018 (CN) .......................... 201811365238.9

(51) Int. Cl.
*H04B 7/08* (2006.01)
*H04W 76/19* (2018.01)
(Continued)

(52) U.S. Cl.
CPC ...... *H04B 7/0888* (2013.01); *H04W 56/0045* (2013.01); *H04W 76/19* (2018.02); *H04W 76/28* (2018.02); *H04W 92/18* (2013.01)

(58) Field of Classification Search
CPC .... H04B 7/0888; H04W 76/19; H04W 76/28; H04W 56/0045; H04W 92/18;
(Continued)

(56) References Cited

U.S. PATENT DOCUMENTS

2018/0063883 A1   3/2018   Nagaraja et al.
2018/0278467 A1   9/2018   John Wilson et al.
(Continued)

FOREIGN PATENT DOCUMENTS

CN    108810933 A    11/2018
CN    108810940 A    11/2018
(Continued)

OTHER PUBLICATIONS

NPL Documents, "BFR triggering in DRX" Spokane, USA Nov. 2, 2018 (Year: 2018).*
Delay of BFR in DRX off Spokane, USA Nov. 2, 2018 (Year: 2018).*
Xiaomi Communications, "Delay of BFR in DRX off", R2-1818186, 3GPP TSG-RAN2 #104, Spokane, USA, Nov. 12-16, 2018, all pages.
(Continued)

*Primary Examiner* — Mewale A Ambaye
(74) *Attorney, Agent, or Firm* — Ladas & Parry, LLP (57) ABSTRACT

The present disclosure provides a beam failure recovery method, a beam failure recovery device and a terminal device. The beam failure recovery method includes: judging whether it is necessary to delay initiating a BFR procedure when a beam failure occurs for the terminal device in a DRX inactive state; directly initiating, by the terminal device, the BFR procedure when it is unnecessary to delay initiating the BFR procedure; and determining an initiation time point for the BFR procedure when it is necessary to delay initiating the BFR procedure, and initiating the BFR procedure at the initiation time point.

17 Claims, 2 Drawing Sheets

(51) Int. Cl.
  *H04W 76/28* (2018.01)
  *H04W 56/00* (2009.01)
  *H04W 92/18* (2009.01)
(58) Field of Classification Search
  CPC ......... H04W 36/0033; H04W 36/0083; H04W 52/02; H04W 56/0005; H04W 72/04; H04W 72/0413
  See application file for complete search history.

(56) References Cited

U.S. PATENT DOCUMENTS

| | | | |
|---|---|---|---|
| 2019/0229777 | A1 | 7/2019 | Guan et al. |
| 2019/0394082 | A1* | 12/2019 | Cirik ................ H04W 24/08 |
| 2020/0036430 | A1 | 1/2020 | Kim et al. |
| 2020/0170020 | A1* | 5/2020 | Agiwal ............. H04W 24/08 |
| 2021/0105171 | A1 | 4/2021 | Chen et al. |
| 2021/0314979 | A1* | 10/2021 | Agiwal ............. H04W 72/21 |

FOREIGN PATENT DOCUMENTS

| | | |
|---|---|---|
| CN | 109565753 A | 4/2019 |
| WO | 2018174586 A1 | 9/2018 |

OTHER PUBLICATIONS

Asustek, "BFR triggering in DRX", R2-1818192, 3GPP TSG-RAN WG2 Meeting #104, Spokane, USA, Nov. 12-16, 2018, all pages.
Qualcomm Inc, MediaTek, OPPO, Fujitsu, "Discussion on BFR procedure in DRX off time", R2-1818284, 3GPP TSG-RAN WG2 Meeting #104, Spokane, USA, Nov. 12-16, 2018, all pages.
Extended European Search Report from EP app. No. 19885501.7, dated Nov. 24, 2021, all pages.
First Office Action and search report from CN app. No. 201811365238.9, dated Dec. 18, 2020, with English translation from Global Dossier, all pages.
International Search Report from PCT/CN2019/117055, dated Jan. 19, 2020, with English translation from WIPO, all pages.
Written Opinion from the International Searching Authority from PCT/CN2019/117055, dated Jan. 19, 2020, with English translation from WIPO, all pages.
International Preliminary Report on Patentability International Search Report from PCT/CN2019/117055, dated May 18, 2021, with English translation from WIPO, all pages.
"Remaining Issues for Beam Management and Beam Failure Recovery", R1-1808264, 3GPP TSG RAN WG1 Meeting #94, Gothenburg, Sweden, Aug. 20-24, 2018, all pages.

* cited by examiner

BEAM FAILURE RECOVERY METHOD AND DEVICE, AND TERMINAL DEVICE

CROSS-REFERENCE TO RELATED APPLICATIONS

The present application is the U.S. national phase of PCT Application No. PCT/CN2019/117055 filed on Nov. 11, 2019, which claims a priority of the Chinese patent application 201811365238.9 filed on Nov. 16, 2018, the disclosures of which are incorporated herein by reference in their entireties.

TECHNICAL FIELD

The present disclosure relates to the field of communication technology, in particular to a beam failure recovery method, a beam failure recovery device, and a terminal device.

BACKGROUND

In order to reduce the power consumption, a Discontinuous Reception (DRX) operation mode has been adopted by a Long Term Evolution (LTE) system. In this operation mode, a control channel is periodically monitored by a terminal device, so as to reduce the power consumption.

Figure 1:
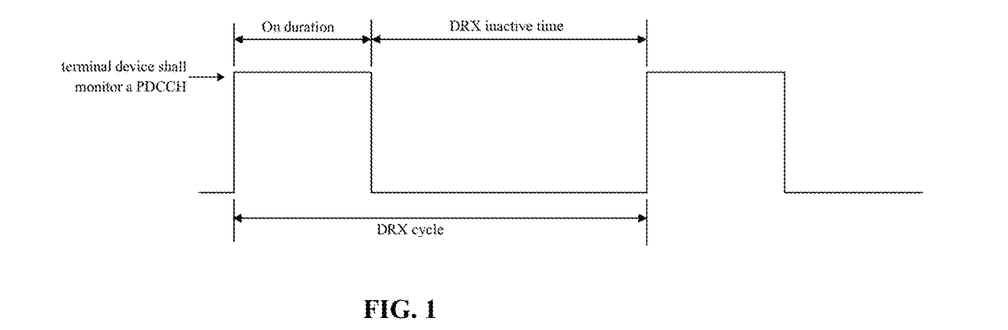
FIG. 1 is a schematic view showing a basic principle of DRX in the related art.

FIG. 1 shows a basic principle of the DRX, where On duration represents a time period within which the control channel is monitored by the terminal device. Within the On duration, a radio frequency channel is opened, and the control channel is monitored continuously. Within a time period other than the On duration, the terminal device is in a sleep state, and a radio frequency link is closed, i.e., the control channel is not monitored any more, so as to reduce the power consumption. The On duration occurs periodically (in cycles), and a specific cycle is configured by a base station.

When any of an On duration timer, an uplink (UL)/Downlink (DL) drx-retransmission timer and a drx-inactivity timer is running, the terminal device will monitor the control channel. A time at which the control channel is monitored by the terminal device is also called as DRX active time. A time at which the DRX has been configured but the control channel is not monitored by the terminal device is called as a DRX inactive time.

Figure 2:
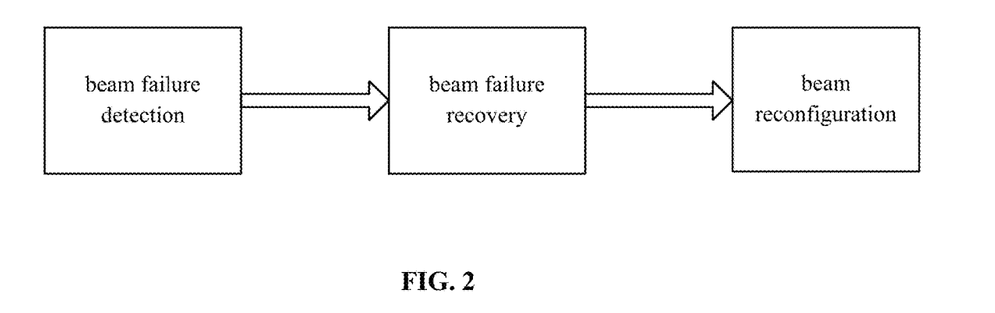
FIG. 2 is a schematic view showing a beam management procedure in the related art.

Beam management has been introduced in $5^{th}$-Generation (5G) New Radio (NR), and Beam Failure Recovery (BFR) is an important part of the beam management. The BFR is a rapid beam recovery technology introduced specially for a high-frequency multi-beam scenario. When a beam failure occurs through Beam Failure Detection (BFD), the BFR may be triggered, and after the completion of this procedure, beam reconfiguration may be performed, as shown in FIG. 2.

BFD

An object of the BFD is a current serving beam of the terminal device, a to-be-measured content is a Synchronization Signal Block (SSB) or Channel State Information-Reference Signal (CSI-RS) of a corresponding serving beam, and the detection is performed on the basis of comparison between a measurement result and a configured Reference Signal Receiving Power (RSRP) threshold. When measurement results of all the serving beams are lower than the RSRP threshold, one beam failure instance indication may be triggered and reported by a physical layer to a Media Access Control (MAC) layer. The MAC layer takes charge of counting the quantity of beam failure indications, and when the quantity of the beam failure indications reaches a maximum value, trigger a beam failure recovery procedure. Different from a Radio Link Monitoring (RLM) procedure, in the BFD, the physical layer merely transmits the beam failure indications, rather than a beam recovery indication, to the MAC layer.

BFR

When channel quality of a current beam measured by the terminal device is poor, the terminal device needs to initiate a BFR procedure. This procedure is implemented through random access. To be specific, the terminal device selects a specific beam to initiate the random access, and after the random access is performed successfully, it is considered that the BFR has been completed on the selected beam. A random access procedure for the BFR may be non-contention-based random access or contention-based random access.

In a word, in order to reduce the power consumption of the terminal device, a DRX mechanism has been introduced into a wireless communication system. In addition, the transmission at the physical layer is performed on the basis of beams for a 5G NR interface. When a beam failure occurs, the terminal device may perform the BFR procedure. However, when the terminal device is currently in the DRX inactive state and the BFR has been triggered, a terminal device's behavior is uncertain.

SUMMARY

An object of the present disclosure is to provide a beam failure recovery method, so as to solve the problem in the related art where the terminal device's behavior is uncertain in the case that the beam failure occurs for the terminal device in the DRX inactive state.

In one aspect, the present disclosure provides in some embodiments a beam failure recovery method for a terminal device, including: judging whether it is necessary to delay initiating a BFR procedure when a beam failure occurs for the terminal device in a DRX inactive state; directly initiating, by the terminal device, the BFR procedure when it is unnecessary to delay initiating the BFR procedure; and determining an initiation time point for the BFR procedure when it is necessary to delay initiating the BFR procedure, and initiating the BFR procedure at the initiation time point.

In some possible embodiments of the present disclosure, the judging whether it is necessary to delay initiating the BFR procedure when the beam failure occurs for the terminal device in the DRX inactive state includes: determining that it is unnecessary to delay initiating the BFR procedure when the beam failure occurs for the terminal device in the DRX inactive state; or determining that it is necessary to delay initiating the BFR procedure when the beam failure occurs for the terminal device in the DRX inactive state; or judging whether it is necessary to delay initiating the BFR procedure in accordance with a Quality of Service (QoS) parameter carried by a current Uu interface and/or a current direct communication interface of the terminal device when the beam failure occurs for the terminal device in the DRX inactive state.

In some possible embodiments of the present disclosure, the determining the initiation time point for the BFR procedure includes: determining a first time point at which the terminal device is to be in a DRX active state next time as well as a target duration; when a time point acquired through subtracting the target duration from the first time point is earlier than or equal to a current time point, determining the current time point as the initiation time point for the BFR procedure; and when the time point acquired through subtracting the target duration from the first time point is later than the current time point, determining the time point acquired through subtracting the target duration from the first time point as the initiation time point for the BFR procedure.

In some possible embodiments of the present disclosure, the determining the initiation time point for the BFR procedure includes: determining a first time point at which the terminal device is to be in a DRX active state next time, a timeout time point of a Timing Advance Timer (TAT), and a target duration; in the case that the timeout time point of the TAT is earlier than or equal to the first time point, when a time point acquired through subtracting the target duration from the timeout time point of the TAT is earlier than or equal to a current time point, determining the current time point as the initiation time point for the BFR procedure, and when the time point acquired through subtracting the target duration from the timeout time point of the TAT is later than the current time point, determining the time point acquired through subtracting the target duration from the timeout time point of the TAT as the initiation time point for the BFR procedure; and in the case that the timeout time point of the TAT is later than the first time point, when a time point acquired through subtracting the target duration from the first time point is earlier than or equal to the current time point, determining the current time point as the initiation time point for the BFR procedure, and when the time point acquired through subtracting the target duration from the first time point is later than the current time point, determining the time point acquired through subtracting the target duration from the first time point as the initiation time point for the BFR.

In some possible embodiments of the present disclosure, the determining the target duration includes: determining a sum of a length of a random access response window and a length of a contention resolution timer as the target duration; or determining the target duration in accordance with a QoS parameter carried by a current Uu interface or a current direct communication interface of the terminal device; or determining the target duration as 0.

In another aspect, the present disclosure provides in some embodiments a beam failure recovery device for a terminal device, including: a judgment module configured to judge whether it is necessary to delay initiating a BFR procedure when a beam failure occurs for the terminal device in a DRX inactive state; a first recovery module configured to directly initiate the BFR procedure when it is unnecessary to delay initiating the BFR procedure; and a second recovery module configured to determine an initiation time point for the BFR procedure when it is necessary to delay initiating the BFR procedure, and initiate the BFR procedure at the initiation time point.

In some possible embodiments of the present disclosure, the judgment module includes a judgment sub-module configured to: determine that it is unnecessary to delay initiating the BFR procedure when the beam failure occurs for the terminal device in the DRX inactive state; or determine that it is necessary to delay initiating the BFR procedure when the beam failure occurs for the terminal device in the DRX inactive state; or judge whether it is necessary to delay initiating the BFR procedure in accordance with a QoS parameter carried by a current Uu interface and/or a current direct communication interface of the terminal device when the beam failure occurs for the terminal device in the DRX inactive state.

In some possible embodiments of the present disclosure, the beam failure recovery device further includes: a first determination module configured to determine a first time point at which the terminal device is to be in a DRX active state next time as well as a target duration; a second determination module configured to, when a time point acquired through subtracting the target duration from the first time point is earlier than or equal to a current time point, determine the current time point as the initiation time point for the BFR procedure; and a third determination module configured to, when the time point acquired through subtracting the target duration from the first time point is later than the current time point, determine the time point acquired through subtracting the target duration from the first time point as the initiation time point for the BFR procedure.

In some possible embodiments of the present disclosure, the beam failure recovery device further includes: a fourth determination module configured to determine a first time point at which the terminal device is to be in a DRX active state next time, a timeout time point of a TAT, and a target duration; a fifth determination module configured to, in the case that the timeout time point of the TAT is earlier than or equal to the first time point, when a time point acquired through subtracting the target duration from the timeout time point of the TAT is earlier than or equal to a current time point, determine the current time point as the initiation time point for the BFR procedure, and when the time point acquired through subtracting the target duration from the timeout time point of the TAT is later than the current time point, determine the time point acquired through subtracting the target duration from the timeout time point of the TAT as the initiation time point for the BFR procedure; and a sixth determination module configured to, in the case that the timeout time point of the TAT is later than the first time point, when a time point acquired through subtracting the target duration from the first time point is earlier than or equal to the current time point, determine the current time point as the initiation time point for the BFR procedure, and when the time point acquired through subtracting the target duration from the first time point is later than the current time point, determine the time point acquired through subtracting the target duration from the first time point as the initiation time point for the BFR.

In some possible embodiments of the present disclosure, the beam failure recovery device further includes a determination sub-module configured to: determine a sum of a length of a random access response window and a length of a contention resolution timer as the target duration; or determine the target duration in accordance with a QoS parameter carried by a current Uu interface or a current direct communication interface of the terminal device; or determine the target duration as 0.

In yet another aspect, the present disclosure provides in some embodiments a terminal device, including a memory, a processor, and a program stored in the memory and executed by the processor. The processor is configured to execute the program so as to: judge whether it is necessary to delay initiating a BFR procedure when a beam failure occurs for the terminal device in a DRX inactive state; directly initiate the BFR procedure when it is unnecessary to delay initiating the BFR procedure; and determine an initiation time point for the BFR procedure when it is necessary to delay initiating the BFR procedure, and initiate the BFR procedure at the initiation time point.

In some possible embodiments of the present disclosure, the processor is further configured to: determine that it is unnecessary to delay initiating the BFR procedure when the beam failure occurs for the terminal device in the DRX inactive state; or determine that it is necessary to delay initiating the BFR procedure when the beam failure occurs for the terminal device in the DRX inactive state; or judge whether it is necessary to delay initiating the BFR procedure in accordance with a QoS parameter carried by a current Uu interface and/or a current direct communication interface of the terminal device when the beam failure occurs for the terminal device in the DRX inactive state.

In some possible embodiments of the present disclosure, the processor is further configured to: determine a first time point at which the terminal device is to be in a DRX active state next time as well as a target duration; when a time point acquired through subtracting the target duration from the first time point is earlier than or equal to a current time point, determine the current time point as the initiation time point for the BFR procedure; and when the time point acquired through subtracting the target duration from the first time point is later than the current time point, determine the time point acquired through subtracting the target duration from the first time point as the initiation time point for the BFR procedure.

In some possible embodiments of the present disclosure, the processor is further configured to: determine a first time point at which the terminal device is to be in a DRX active state next time, a timeout time point of a TAT, and a target duration; in the case that the timeout time point of the TAT is earlier than or equal to the first time point, when a time point acquired through subtracting the target duration from the timeout time point of the TAT is earlier than or equal to a current time point, determine the current time point as the initiation time point for the BFR procedure, and when the time point acquired through subtracting the target duration from the timeout time point of the TAT is later than the current time point, determine the time point acquired through subtracting the target duration from the timeout time point of the TAT as the initiation time point for the BFR procedure; and in the case that the timeout time point of the TAT is later than the first time point, when a time point acquired through subtracting the target duration from the first time point is earlier than or equal to the current time point, determine the current time point as the initiation time point for the BFR procedure, and when the time point acquired through subtracting the target duration from the first time point is later than the current time point, determine the time point acquired through subtracting the target duration from the first time point as the initiation time point for the BFR.

In some possible embodiments of the present disclosure, the processor is further configured to: determine a sum of a length of a random access response window and a length of a contention resolution timer as the target duration; or determine the target duration in accordance with a QoS parameter carried by a current Uu interface or a current direct communication interface of the terminal device; or determine the target duration as 0.

In still yet another aspect, the present disclosure provides in some embodiments a computer-readable storage medium storing therein a computer program. The computer program is executed by a processor so as to implement the steps of the above-mentioned beam failure recovery method.

The present disclosure at least has the following beneficial effect.

According to the beam failure recovery method, the beam failure recovery device and the terminal device in the embodiments of the present disclosure, in the case that the beam failure occurs for the terminal device in the DRX inactive state, the terminal device may judge whether it is necessary to delay initiating the BFR procedure, and then initiate the BFR procedure in accordance with a judgment result. As a result, it is able to make a specific behavior of the terminal device clear in the case that the beam failure occurs for the terminal device in the DRX inactive state, thereby to ensure the integrity and reliability of a protocol.

DETAILED DESCRIPTION

BFR refers to a procedure where a beam whose channel quality meets the requirement is found by a terminal device, specifically a procedure where a new available SSB or CSI-RS is selected by the terminal device. Different SSBs or CSI-RSs correspond to different beams. In the following description, the selection of beam is equivalent or similar to the selection of SSB or CSI-RS.

Non-contention-based random access for the BFR will be described as follows. A candidate beam set is configured by a network side for the terminal device, and non-contention-based access resources (a Physical Radon Access Channel (PRACH) resource and/or a preamble code) are assigned on a plurality of beams in the candidate beam set. When there is a non-contention-based random access resource available on a selected beam, the terminal device may initiate a non-contention-based random access procedure. After the transmission of Msg1, when a Physical Downlink Control Channel (PDCCH) command scrambled with a Cell-Radio Network Temporary Identifier (C-RNTI) of the terminal device has been received within a configured time period in a CORESET (control resource set) configured to receive the PDCCH command, it may be deemed that the non-contention-based random access procedure has been performed successfully. With respect to the non-contention-based random access for the BFR, a base station may configured independent random access parameters, which include ra-Response Window-BFR, preamble Initial Received Target Power-BFR, power Ramping Step-BFR, Preamble Trans-Max-BFR, etc.

In order to make the objects, the technical solutions and the advantages of the present disclosure more apparent, the present disclosure will be described hereinafter in a clear and complete manner in conjunction with the drawings and embodiments.

Figure 3:
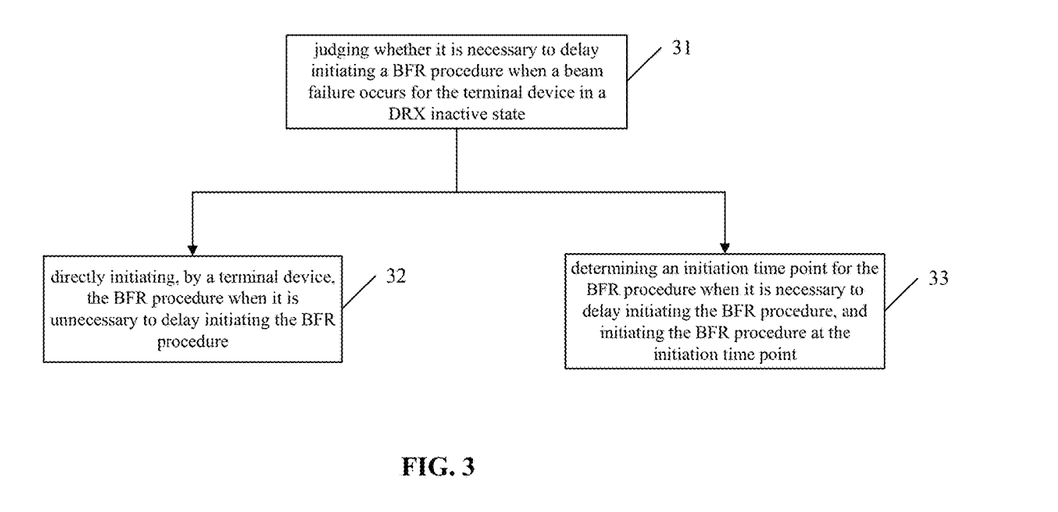
FIG. 3 is a flow chart of a beam failure recovery method according to one embodiment of the present disclosure.

As shown in FIG. 3, the present disclosure provides in some embodiments a beam failure recovery method for a terminal device, which includes: Step 31 of judging whether it is necessary to delay initiating a BFR procedure when a beam failure occurs for the terminal device in a DRX inactive state; Step 32 of directly initiating, by the terminal device, the BFR procedure when it is unnecessary to delay initiating the BFR procedure; and Step 33 of determining an initiation time point for the BFR procedure when it is necessary to delay initiating the BFR procedure, and initiating the BFR procedure at the initiation time point.

In the embodiments of the present disclosure, the terminal device may perform beam failure judgment in accordance with a beam failure judgment procedure in the related art, and when the beam failure has been judged and the terminal device is in the DRX inactive state, it may be determined that the beam failure occurs for the terminal device in the DRX inactive state.

It should be appreciated that, a time at which the DRX has been configured but a control channel is not monitored by the terminal device may be called as a DRX inactive time. A terminal device within the DRX inactive time may be called as a terminal device in the DRX inactive state.

When the beam failure occurs for the terminal device in the DRX inactive state, the terminal device may judge whether it is necessary to delay initiating the BFR procedure. When it is necessary to delay initiating the BFR procedure, the terminal device may determine the initiation time point for the BFR procedure, and initiate the BFR procedure at the initiation time point. When it is unnecessary to delay initiating the BFR procedure, the terminal device may initiate the BFR procedure immediately.

To be specific, in the embodiments of the present disclosure, Step 31 may include: determining that it is unnecessary to delay initiating the BFR procedure, i.e., determining that the initiation of the BFR procedure is not delayed all the time, when the beam failure occurs for the terminal device in the DRX inactive state; or determining that it is necessary to delay initiating the BFR procedure, i.e., determining that the initiation of the BFR procedure is delayed all the time, when the beam failure occurs for the terminal device in the DRX inactive state; or judging whether it is necessary to delay initiating the BFR procedure in accordance with a QoS parameter carried by a current Uu interface and/or a current direct communication interface of the terminal device when the beam failure occurs for the terminal device in the DRX inactive state.

The Uu interface may refer to a communication interface between a terminal device and a base station, and the direct communication interface may refer to a communication interface between terminal devices.

For example, the QoS parameter may include a service delay. When a low service delay for a service carried by the Uu interface and/or the direct communication interface is demanded, the terminal device may determine that it is necessary to delay initiating the BFR procedure. When a high service delay for the service carried by the Uu interface and/or the direct communication interface is demanded, the terminal device may determine that it is unnecessary to delay initiating the BFR procedure.

It should be appreciated that, at least two methods for determining the initiation time point for the BFR procedure will be provided in the embodiments of the present disclosure.

In a possible embodiment of the present disclosure, the determining the initiation time point for the BFR procedure may include: determining a first time point at which the terminal device is to be in a DRX active state next time as well as a target duration; when a time point acquired through subtracting the target duration from the first time point is earlier than or equal to a current time point, determining the current time point as the initiation time point for the BFR procedure; and when the time point acquired through subtracting the target duration from the first time point is later than the current time point, determining the time point acquired through subtracting the target duration from the first time point as the initiation time point for the BFR procedure.

To be specific, the first time point may be a time point at which the terminal device is to be in On duration next time.

The first time point may be set as M, and the target duration may be set as T. When a time point M−T is earlier than or equal to the current time point, the BFR procedure may be initiated immediately. When the time point M−T is later than the current time point, the terminal device may initiate the BFR procedure at the time point M−T.

In another possible embodiment of the present disclosure, the determining the initiation time point for the BFR procedure may include: determining a first time point at which the terminal device is to be in a DRX active state next time, a timeout time point of a TAT, and a target duration; in the case that the timeout time point of the TAT is earlier than or equal to the first time point, when a time point acquired through subtracting the target duration from the timeout time point of the TAT is earlier than or equal to a current time point, determining the current time point as the initiation time point for the BFR procedure, and when the time point acquired through subtracting the target duration from the timeout time point of the TAT is later than the current time point, determining the time point acquired through subtracting the target duration from the timeout time point of the TAT as the initiation time point for the BFR procedure; and in the case that the timeout time point of the TAT is later than the first time point, when a time point acquired through subtracting the target duration from the first time point is earlier than or equal to the current time point, determining the current time point as the initiation time point for the BFR procedure, and when the time point acquired through subtracting the target duration from the first time point is later than the current time point, determining the time point acquired through subtracting the target duration from the first time point as the initiation time point for the BFR.

To be specific, the first time point may be a time point at which the terminal device is to be in On duration next time.

The first time point may be set as M, the timeout time point of the TAT may be set as N, and the target duration may be set as T. In the case that N is earlier than or equal to M, when N−T is earlier than or equal to the current time point, the terminal device may initiate the BFR procedure immediately, and when N−T is later than the current time point, the terminal device may initiate the BFR procedure at the time point N−T. In the case that N is later than M, when M−T is earlier than or equal to the current time point, the terminal device may initiate the BFR procedure immediately, and when M−T is later than the current time point, the terminal device may initiate the BFR procedure at the time point M−T.

It should be appreciated that, the determining the target duration may at least include: determining a sum of a length of a random access response window and a length of a contention resolution timer as the target duration, i.e., determining the target duration as a constant value; or determining the target duration in accordance with a QoS parameter carried by a current Uu interface or a current direct communication interface of the terminal device, i.e., determining the target duration as a variable value (e.g., a value of the target duration may be determined in accordance with a time delay requirement of a service which is most sensitive to the service delay requirement for the current Uu interface or the current direct communication interface); or determining the target duration as 0, i.e., determining the target duration as a constant value.

In order to describe the beam failure recovery method in a clearer manner, the beam failure recovery method will be described hereinafter in conjunction with two embodiments.

First Embodiment

Step 1: the terminal device may perform beam failure judgment.

The terminal device may perform the beam failure judgment in accordance with a beam failure judgment procedure in the related art. For example, two configuration parameters (i.e., beamFailureInstanceMaxCount and beamFailureDetectionTimer) and one variable (i.e., BFI_COUNTER). During the operation of the beamFailureDetectionTimer, when a value of the BFI_COUNTER reaches beamFailureInstanceMaxCount, the beam failure may be judged.

Step 2: the terminal device may determine whether it is necessary to delay initiating the BFR procedure. To be specific, the terminal device may determine whether it is necessary to delay initiating the BFR procedure on the basis of any of the following principles. In a first method, the initiation of the BFR procedure may not be delayed all the time, and the BFR procedure may be initiated immediately when the beam failure occurs. In a second method, the initiation of the BFR procedure may be delayed all the time. In a third method, whether it is necessary to delay initiating the BFR procedure may be determined in accordance with a QoS parameter carried by a current Uu interface and/or a current direct communication interface of the terminal device.

When the terminal device determines that it is unnecessary to delay initiating the BFR procedure, the terminal device may initiate the BFR procedure immediately.

When the terminal device determines that it is necessary to delay initiating the BFR procedure, the terminal device may determine the initiation time point for the BFR procedure as follows. The terminal device may determine a time point M at which the terminal device is to be in On duration next time, and determine a time period T. When M−T is earlier than or equal to the current time point, the terminal device may initiate the BFR procedure immediately. When M−T is later than the current time point, the terminal device may initiate the BFR procedure at M−T.

In the above procedure, the time period T may be determined as follows. The time period T may have a constant value, e.g., a sum of a length of an RAR window corresponding to the BFR procedure and a length of a contention resolution timer, or zero. In addition, the time period T may have a variable value determined in accordance with a QoS parameter of a service for the terminal device at the current Uu interface. For example, a value of T may be determined in accordance with a time delay requirement of a service which is most sensitive to the service delay requirement for the current Uu interface or the current direct communication interface.

Step 3: the terminal device may initiate the BFR procedure.

The terminal device may initiate the BFR procedure at the determined initiation time point for the BFR procedure.

Second Embodiment

Step 4: the terminal device may perform beam failure judgment.

The terminal device may perform the beam failure judgment in accordance with a beam failure judgment procedure in the related art. For example, two configuration parameters (i.e., beamFailureInstanceMaxCount and beamFailureDetectionTimer) and one variable (i.e., BFI_COUNTER). During the operation of the beamFailureDetectionTimer, when a value of the BFI_COUNTER reaches beamFailureInstanceMaxCount, the beam failure may be judged.

Step 5: the terminal device may determine whether it is necessary to delay initiating the BFR procedure. To be specific, the terminal device may determine whether it is necessary to delay initiating the BFR procedure on the basis of any of the following principles. In a first method, the initiation of the BFR procedure may not be delayed all the time, and the BFR procedure may be initiated immediately when the beam failure occurs. In a second method, the initiation of the BFR procedure may be delayed all the time. In a third method, whether it is necessary to delay initiating the BFR procedure may be determined in accordance with a QoS parameter carried by a current Uu interface and/or a current direct communication interface of the terminal device.

When the terminal device determines that it is unnecessary to delay initiating the BFR procedure, the terminal device may initiate the BFR procedure immediately.

When the terminal device determines that it is necessary to delay initiating the BFR procedure, the terminal device may determine the initiation time point for the BFR procedure as follows. The terminal device may determine a time point M at which the terminal device is to be in On duration next time, and determine whether the TAT is to be timed out before M in accordance with a current operating condition of the TAT.

When the TAT is to be timed out, the terminal device may determine the timeout time point of the TAT as N and determine a time period T. When N−T is earlier than or equal to the current time point, the terminal device may initiate the BFR procedure immediately, and when N−T is later than the current time point, the terminal device may initiate the BFR procedure at N−T.

When the TAT is not to be timed out, the terminal device may determine a time point M at which the terminal device is to be in On duration next time, and determine the time period T. When M−T is earlier than or equal to the current time point, the terminal device may initiate the BFR procedure immediately, and when M−T is later than the current time point, the terminal device may initiate the BFR procedure at M−T.

In the above procedure, the time period T may be determined as follows. The time period T may have a constant value, e.g., a sum of a length of an RAR window corresponding to the BFR procedure and a length of a contention resolution timer, or zero. In addition, the time period T may have a variable value determined in accordance with a QoS parameter of a service for the terminal device at the current Uu interface. For example, a value of T may be determined in accordance with a time delay requirement of a service which is most sensitive to the service delay requirement for the current Uu interface or the current direct communication interface.

Step 6: the terminal device may initiate the BFR procedure.

The terminal device may initiate the BFR procedure at the determined initiation time point for the BFR procedure.

In a word, according to the embodiments of the present disclosure, in the case that the beam failure occurs for the terminal device in the DRX inactive state, the terminal device may judge whether it is necessary to delay initiating the BFR procedure, and then initiate the BFR procedure in accordance with a judgment result. As a result, it is able to make a specific behavior of the terminal device clear in the case that the beam failure occurs for the terminal device in the DRX inactive state, thereby to ensure the integrity and reliability of a protocol.

Figure 4:
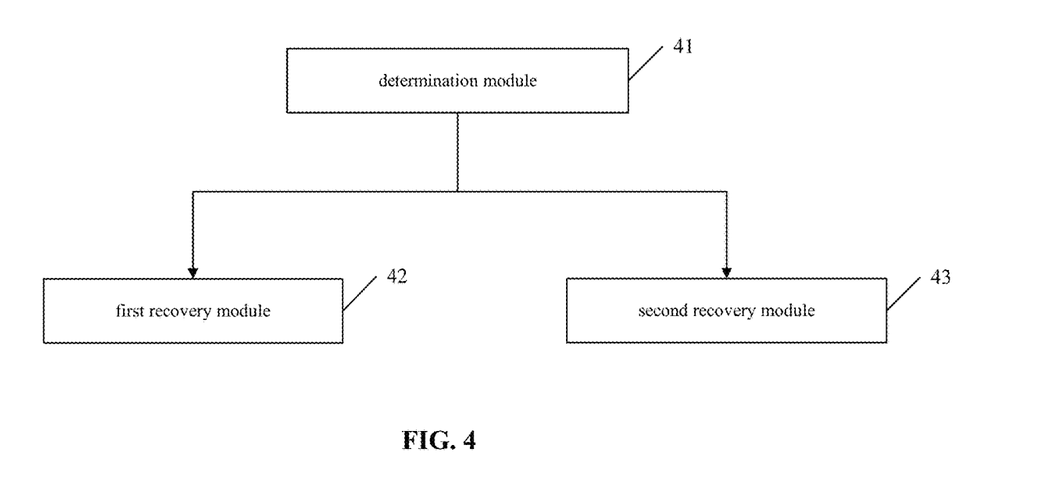
FIG. 4 is a schematic view showing a beam failure recovery device according to one embodiment of the present disclosure.

As shown in FIG. 4, the present disclosure further provides in some embodiments a beam failure recovery device for a terminal device, which includes: a judgment module 41 configured to judge whether it is necessary to delay initiating a BFR procedure when a beam failure occurs for the terminal device in a DRX inactive state; a first recovery module 42 configured to directly initiate the BFR procedure when it is unnecessary to delay initiating the BFR procedure; and a second recovery module 43 configured to determine an initiation time point for the BFR procedure when it is necessary to delay initiating the BFR procedure, and initiate the BFR procedure at the initiation time point.

In some possible embodiments of the present disclosure, the judgment module may include a judgment sub-module configured to: determine that it is unnecessary to delay initiating the BFR procedure when the beam failure occurs for the terminal device in the DRX inactive state; or determine that it is necessary to delay initiating the BFR procedure when the beam failure occurs for the terminal device in the DRX inactive state; or judge whether it is necessary to delay initiating the BFR procedure in accordance with a QoS parameter carried by a current Uu interface and/or a current direct communication interface of the terminal device when the beam failure occurs for the terminal device in the DRX inactive state.

In some possible embodiments of the present disclosure, the beam failure recovery device may further include: a first determination module configured to determine a first time point at which the terminal device is to be in a DRX active state next time as well as a target duration; a second determination module configured to, when a time point acquired through subtracting the target duration from the first time point is earlier than or equal to a current time point, determine the current time point as the initiation time point for the BFR procedure; and a third determination module configured to, when the time point acquired through subtracting the target duration from the first time point is later than the current time point, determine the time point acquired through subtracting the target duration from the first time point as the initiation time point for the BFR procedure.

In some possible embodiments of the present disclosure, the beam failure recovery device may further include: a fourth determination module configured to determine a first time point at which the terminal device is to be in a DRX active state next time, a timeout time point of a TAT, and a target duration; a fifth determination module configured to, in the case that the timeout time point of the TAT is earlier than or equal to the first time point, when a time point acquired through subtracting the target duration from the timeout time point of the TAT is earlier than or equal to a current time point, determine the current time point as the initiation time point for the BFR procedure, and when the time point acquired through subtracting the target duration from the timeout time point of the TAT is later than the current time point, determine the time point acquired through subtracting the target duration from the timeout time point of the TAT as the initiation time point for the BFR procedure; and a sixth determination module configured to, in the case that the timeout time point of the TAT is later than the first time point, when a time point acquired through subtracting the target duration from the first time point is earlier than or equal to the current time point, determine the current time point as the initiation time point for the BFR procedure, and when the time point acquired through subtracting the target duration from the first time point is later than the current time point, determine the time point acquired through subtracting the target duration from the first time point as the initiation time point for the BFR.

In some possible embodiments of the present disclosure, the beam failure recovery device may further include a determination sub-module configured to: determine a sum of a length of a random access response window and a length of a contention resolution timer as the target duration; or determine the target duration in accordance with a QoS parameter carried by a current Uu interface or a current direct communication interface of the terminal device; or determine the target duration as 0.

In a word, according to the embodiments of the present disclosure, in the case that the beam failure occurs for the terminal device in the DRX inactive state, the terminal device may judge whether it is necessary to delay initiating the BFR procedure, and then initiate the BFR procedure in accordance with a judgment result. As a result, it is able to make a specific behavior of the terminal device clear in the case that the beam failure occurs for the terminal device in the DRX inactive state, thereby to ensure the integrity and reliability of a protocol.

It should be appreciated that, the beam failure recovery device in the embodiments of the present disclosure is capable of implementing the beam failure recovery method, so all the embodiments about the beam failure recovery method may be applied to the beam failure recovery device with a same or similar beneficial effect.

Figure 5:
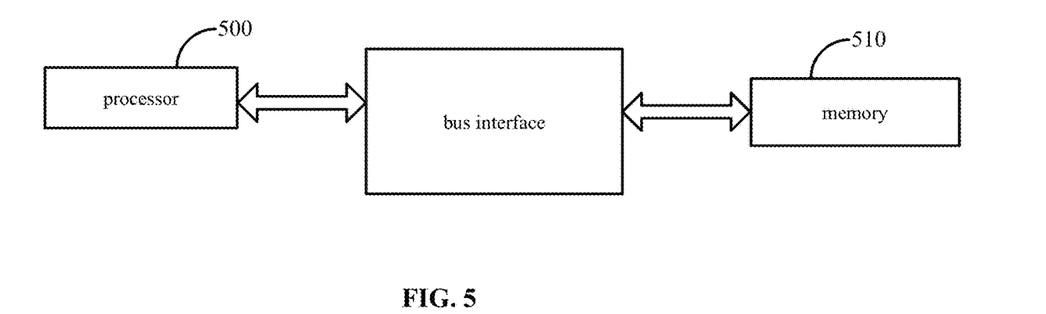
FIG. 5 is a schematic view showing a terminal device according to one embodiment of the present disclosure.

As shown in FIG. 5, the present disclosure further provides in some embodiments a terminal device, which includes a memory 510, a processor 500, and a program stored in the memory 510 and executed by the processor 500. The processor 500 is configured to execute the program, so as to: judge whether it is necessary to delay initiating a BFR procedure when a beam failure occurs for the terminal device in a DRX inactive state; directly initiate the BFR procedure when it is unnecessary to delay initiating the BFR procedure; and determine an initiation time point for the BFR procedure when it is necessary to delay initiating the BFR procedure, and initiate the BFR procedure at the initiation time point.

In some possible embodiments of the present disclosure, the processor 500 is further configured to: determine that it is unnecessary to delay initiating the BFR procedure when the beam failure occurs for the terminal device in the DRX inactive state; or determine that it is necessary to delay initiating the BFR procedure when the beam failure occurs for the terminal device in the DRX inactive state; or judge whether it is necessary to delay initiating the BFR procedure in accordance with a QoS parameter carried by a current Uu interface and/or a current direct communication interface of the terminal device when the beam failure occurs for the terminal device in the DRX inactive state.

In some possible embodiments of the present disclosure, the processor 500 is further configured to: determine a first time point at which the terminal device is to be in a DRX active state next time as well as a target duration; when a time point acquired through subtracting the target duration from the first time point is earlier than or equal to a current time point, determine the current time point as the initiation time point for the BFR procedure; and when the time point acquired through subtracting the target duration from the first time point is later than the current time point, determine the time point acquired through subtracting the target duration from the first time point as the initiation time point for the BFR procedure.

In some possible embodiments of the present disclosure, the processor 500 is further configured to: determine a first time point at which the terminal device is to be in a DRX active state next time, a timeout time point of a TAT, and a target duration; in the case that the timeout time point of the TAT is earlier than or equal to the first time point, when a time point acquired through subtracting the target duration from the timeout time point of the TAT is earlier than or equal to a current time point, determine the current time point as the initiation time point for the BFR procedure, and when the time point acquired through subtracting the target duration from the timeout time point of the TAT is later than the current time point, determine the time point acquired through subtracting the target duration from the timeout time point of the TAT as the initiation time point for the BFR procedure; and in the case that the timeout time point of the TAT is later than the first time point, when a time point acquired through subtracting the target duration from the first time point is earlier than or equal to the current time point, determine the current time point as the initiation time point for the BFR procedure, and when the time point acquired through subtracting the target duration from the first time point is later than the current time point, determine the time point acquired through subtracting the target duration from the first time point as the initiation time point for the BFR.

In some possible embodiments of the present disclosure, the processor 500 is further configured to: determine a sum of a length of a random access response window and a length of a contention resolution timer as the target duration; or determine the target duration in accordance with a QoS parameter carried by a current Uu interface or a current direct communication interface of the terminal device; or determine the target duration as 0.

In a word, according to the embodiments of the present disclosure, the beam failure recovery device and the terminal device in the embodiments of the present disclosure, in the case that the beam failure occurs for the terminal device in the DRX inactive state, the terminal device may judge whether it is necessary to delay initiating the BFR procedure, and then initiate the BFR procedure in accordance with a judgment result. As a result, it is able to make a specific behavior of the terminal device clear in the case that the beam failure occurs for the terminal device in the DRX inactive state, thereby to ensure the integrity and reliability of a protocol.

It should be appreciated that, the terminal device in the embodiments of the present disclosure is capable of implementing the above-mentioned beam failure recovery method, so all the embodiments about the beam failure recovery method may be applied to the terminal device with a same or similar beneficial effect.

The present disclosure further provides in some embodiments a computer-readable storage medium storing therein a computer program. The computer program is executed by a processor so as to implement the above-mentioned beam failure recovery method with a same technical effect, which will not be particularly defined herein. The computer-readable storage medium may be Read Only Memory (ROM), Random Access Memory (RAM), magnetic disk or optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The present disclosure has been described hereinabove in conjunction with the drawings and embodiments. The embodiments are for illustrative purposes only, but shall not be used to limit the scope of the present disclosure. In light of the present disclosure, a person skilled in the art may make various modifications and alterations without departing from the spirit of the present disclosure and the scope defined by the appended claims, and these modifications and alterations shall fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A beam failure recovery method for a terminal device, comprising:
    judging, by the terminal device, whether it is necessary to delay initiating a Beam Failure Recovery (BFR) procedure when a beam failure occurs for the terminal device in a Discontinuous Reception (DRX) inactive state;
    directly initiating, by the terminal device, the BFR procedure when it is unnecessary to delay initiating the BFR procedure; and
    determining an initiation time point for the BFR procedure when it is necessary to delay initiating the BFR procedure, and initiating the BFR procedure at the initiation time point;
    wherein the determining the initiation time point for the BFR procedure comprises:
    determining a first time point at which the terminal device is to be in a DRX active state next time, a timeout time point of a Timing Advance Timer (TAT), and a target duration;
    in the case that the timeout time point of the TAT is earlier than or equal to the first time point, when a time point acquired through subtracting the target duration from the timeout time point of the TAT is earlier than or equal to a current time point, determining the current time point as the initiation time point for the BFR procedure, and when the time point acquired through subtracting the target duration from the timeout time point of the TAT is later than the current time point, determining the time point acquired through subtracting the target duration from the timeout time point of the TAT as the initiation time point for the BFR procedure; and in the case that the timeout time point of the TAT is later than the first time point, when a time point acquired through subtracting the target duration from the first time point is earlier than or equal to the current time point, determining the current time point as the initiation time point for the BFR procedure, and when the time point acquired through subtracting the target duration from the first time point is later than the current time point, determining the time point acquired through subtracting the target duration from the first time point as the initiation time point for the BFR.

2. The beam failure recovery method according to claim 1, wherein the judging whether it is necessary to delay initiating the BFR procedure when the beam failure occurs for the terminal device in the DRX inactive state comprises:

determining that it is unnecessary to delay initiating the BFR procedure when the beam failure occurs for the terminal device in the DRX inactive state; or determining that it is necessary to delay initiating the BFR procedure when the beam failure occurs for the terminal device in the DRX inactive state; or judging whether it is necessary to delay initiating the BFR procedure in accordance with a Quality of Service (QoS) parameter carried by at least one of a current Uu interface or a current direct communication interface of the terminal device when the beam failure occurs for the terminal device in the DRX inactive state.

3. The beam failure recovery method according to claim 1, wherein the determining the initiation time point for the BFR procedure comprises:

determining a first time point at which the terminal device is to be in a DRX active state next time as well as a target duration;

when a time point acquired through subtracting the target duration from the first time point is earlier than or equal to a current time point, determining the current time point as the initiation time point for the BFR procedure; and when the time point acquired through subtracting the target duration from the first time point is later than the current time point, determining the time point acquired through subtracting the target duration from the first time point as the initiation time point for the BFR procedure.

4. The beam failure recovery method according to claim 3, wherein the determining the target duration comprises:

determining a sum of a length of a random access response window and a length of a contention resolution timer as the target duration; or determining the target duration in accordance with a QoS parameter carried by a current Uu interface or a current direct communication interface of the terminal device; or determining the target duration as 0.

5. A terminal device, comprising: a memory, a processor, and a program stored in the memory and executed by the processor, wherein the processor is configured to execute the program so as to:

judge whether it is necessary to delay initiating a Beam Failure Recovery (BFR) procedure when a beam failure occurs for the terminal device in a Discontinuous Reception (DRX) inactive state; directly initiate the BFR procedure when it is unnecessary to delay initiating the BFR procedure; and determine an initiation time point for the BFR procedure when it is necessary to delay initiating the BFR procedure, and initiate the BFR procedure at the initiation time point;

wherein the processor is further configured to:

determine a first time point at which the terminal device is to be in a DRX active state next time, a timeout time point of a Timing Advance Timer (TAT), and a target duration;

in the case that the timeout time point of the TAT is earlier than or equal to the first time point, when a time point acquired through subtracting the target duration from the timeout time point of the TAT is earlier than or equal to a current time point, determine the current time point as the initiation time point for the BFR procedure, and when the time point acquired through subtracting the target duration from the timeout time point of the TAT is later than the current time point, determine the time point acquired through subtracting the target duration from the timeout time point of the TAT as the initiation time point for the BFR procedure; and in the case that the timeout time point of the TAT is later than the first time point, when a time point acquired through subtracting the target duration from the first time point is earlier than or equal to the current time point, determine the current time point as the initiation time point for the BFR procedure, and when the time point acquired through subtracting the target duration from the first time point is later than the current time point, determine the time point acquired through subtracting the target duration from the first time point as the initiation time point for the BFR.

6. The terminal device according to claim 5, wherein the processor is further configured to:

determine that it is unnecessary to delay initiating the BFR procedure when the beam failure occurs for the terminal device in the DRX inactive state; or determine that it is necessary to delay initiating the BFR procedure when the beam failure occurs for the terminal device in the DRX inactive state; or judge whether it is necessary to delay initiating the BFR procedure in accordance with a Quality of Service (QoS) parameter carried by at least one of a current Uu interface or a current direct communication interface of the terminal device when the beam failure occurs for the terminal device in the DRX inactive state.

7. The terminal device according to claim 5, wherein the processor is further configured to:

determine a first time point at which the terminal device is to be in a DRX active state next time as well as a target duration;

when a time point acquired through subtracting the target duration from the first time point is earlier than or equal to a current time point, determine the current time point as the initiation time point for the BFR procedure; and when the time point acquired through subtracting the target duration from the first time point is later than the current time point, determine the time point acquired through subtracting the target duration from the first time point as the initiation time point for the BFR procedure.

8. The terminal device according to claim 7, wherein the processor is further configured to: determine a sum of a length of a random access response window and a length of a contention resolution timer as the target duration; or determine the target duration in accordance with a QoS parameter carried by a current Uu interface or a current direct communication interface of the terminal device; or determine the target duration as 0.

9. A non-transitory computer-readable storage medium storing therein a computer program, wherein the computer program is executed by a processor so as to implement a beam failure recovery method for a terminal device, comprising:
  judging, by the terminal device, whether it is necessary to delay initiating a Beam Failure Recovery (BFR) procedure when a beam failure occurs for the terminal device in a Discontinuous Reception (DRX) inactive state;
  directly initiating, by the terminal device, the BFR procedure when it is unnecessary to delay initiating the BFR procedure; and
  determining an initiation time point for the BFR procedure when it is necessary to delay initiating the BFR procedure, and initiating the BFR procedure at the initiation time point;
  wherein the determining the initiation time point for the BFR procedure comprises:
  determining a first time point at which the terminal device is to be in a DRX active state next time, a timeout time point of a Timing Advance Timer (TAT), and a target duration;
  in the case that the timeout time point of the TAT is earlier than or equal to the first time point, when a time point acquired through subtracting the target duration from the timeout time point of the TAT is earlier than or equal to a current time point, determining the current time point as the initiation time point for the BFR procedure, and when the time point acquired through subtracting the target duration from the timeout time point of the TAT is later than the current time point, determining the time point acquired through subtracting the target duration from the timeout time point of the TAT as the initiation time point for the BFR procedure; and
  in the case that the timeout time point of the TAT is later than the first time point, when a time point acquired through subtracting the target duration from the first time point is earlier than or equal to the current time point, determining the current time point as the initiation time point for the BFR procedure, and when the time point acquired through subtracting the target duration from the first time point is later than the current time point, determining the time point acquired through subtracting the target duration from the first time point as the initiation time point for the BFR.

10. The non-transitory computer-readable storage medium according to claim 9, wherein the judging whether it is necessary to delay initiating the BFR procedure when the beam failure occurs for the terminal device in the DRX inactive state comprises:
  determining that it is unnecessary to delay initiating the BFR procedure when the beam failure occurs for the terminal device in the DRX inactive state; or
  determining that it is necessary to delay initiating the BFR procedure when the beam failure occurs for the terminal device in the DRX inactive state; or
  judging whether it is necessary to delay initiating the BFR procedure in accordance with a Quality of Service (QoS) parameter carried by at least one of a current Uu interface or a current direct communication interface of the terminal device when the beam failure occurs for the terminal device in the DRX inactive state.

11. The non-transitory computer-readable storage medium according to claim 9, wherein the determining the initiation time point for the BFR procedure comprises:
  determining a first time point at which the terminal device is to be in a DRX active state next time as well as a target duration;
  when a time point acquired through subtracting the target duration from the first time point is earlier than or equal to a current time point, determining the current time point as the initiation time point for the BFR procedure; and
  when the time point acquired through subtracting the target duration from the first time point is later than the current time point, determining the time point acquired through subtracting the target duration from the first time point as the initiation time point for the BFR procedure.

12. The non-transitory computer-readable storage medium according to claim 11, wherein the determining the target duration comprises:
  determining a sum of a length of a random access response window and a length of a contention resolution timer as the target duration; or
  determining the target duration in accordance with a QoS parameter carried by a current Uu interface or a current direct communication interface of the terminal device; or
  determining the target duration as 0.

13. The beam failure recovery method according to claim 1, wherein the determining the target duration comprises: determining a sum of a length of a random access response window and a length of a contention resolution timer as the target duration; or determining the target duration in accordance with a QoS parameter carried by a current Uu interface or a current direct communication interface of the terminal device; or determining the target duration as 0.

14. The terminal device according to claim 5, wherein the processor is further configured to: determine a sum of a length of a random access response window and a length of a contention resolution timer as the target duration; or determine the target duration in accordance with a QoS parameter carried by a current Uu interface or a current direct communication interface of the terminal device; or determine the target duration as 0.

15. The non-transitory computer-readable storage medium according to claim 9, wherein the determining the target duration comprises: determining a sum of a length of a random access response window and a length of a contention resolution timer as the target duration; or determining the target duration in accordance with a QoS parameter carried by a current Uu interface or a current direct communication interface of the terminal device; or determining the target duration as 0.

16. The beam failure recovery method according to claim 1, wherein
  the BFR procedure refers to a procedure where a beam whose channel quality meets the requirement is found by the terminal device, or a procedure where a new available Synchronization Signal Block (SSB) or Channel State Information-Reference Signal (CSI-RS) is selected by the terminal device, wherein different SSBs or CSI-RSs correspond to different beams.

17. The terminal device according to claim 5, wherein
  the BFR procedure refers to a procedure where a beam whose channel quality meets the requirement is found by the terminal device, or a procedure where a new available Synchronization Signal Block (SSB) or Channel State Information-Reference Signal (CSI-RS) is selected by the terminal device, wherein different SSBs or CSI-RSs correspond to different beams.

* * * * *